(12) United States Patent
Wang et al.

(10) Patent No.: US 8,737,480 B2
(45) Date of Patent: May 27, 2014

(54) JOINT SPATIAL AND TEMPORAL BLOCK MERGE MODE FOR HEVC

(75) Inventors: Limin Wang, San Diego, CA (US); Jian Lou, San Diego, CA (US); Yue Yu, San Diego, CA (US)

(73) Assignee: Motorola Mobility LLC, Chicago, IL (US)

(*) Notice: Subject to any disclaimer, the term of this patent is extended or adjusted under 35 U.S.C. 154(b) by 71 days.

(21) Appl. No.: 13/351,906

(22) Filed: Jan. 17, 2012

(65) Prior Publication Data

US 2013/0114720 A1 May 9, 2013

Related U.S. Application Data

(60) Provisional application No. 61/433,006, filed on Jan. 14, 2011.

(51) Int. Cl.
*H04N 7/26* (2006.01)

(52) U.S. Cl.
USPC ............ 375/240.16; 375/240.12; 375/240.15; 375/240.24; 375/240.26

(58) Field of Classification Search
CPC .............. H04N 19/00278; H04N 19/00369; H04N 19/00375; H04N 19/00684; H04N 19/00696
USPC ............ 375/240.16, 240.12, 240.15, 240.24, 375/240.26
See application file for complete search history.

(56) References Cited

U.S. PATENT DOCUMENTS

| | | | |
|---|---|---|---|
| 2007/0047649 A1* | 3/2007 | Suzuki et al. | 375/240.15 |
| 2007/0140352 A1* | 6/2007 | Bhaskaran et al. | 375/240.24 |
| 2008/0267292 A1 | 10/2008 | Ito et al. | |
| 2010/0220790 A1* | 9/2010 | Jeon et al. | 375/240.16 |
| 2010/0290530 A1* | 11/2010 | Huang et al. | 375/240.16 |
| 2012/0027094 A1* | 2/2012 | Sato et al. | 375/240.16 |

FOREIGN PATENT DOCUMENTS

WO WO 2009051419 A2 * 4/2009

OTHER PUBLICATIONS

M. Winken, et al., "Description of Video Coding Technology Proposal by Fraunhofer HHI", Document # JCTVC-A116, Dresden, Germany, Apr. 2010.
J. Jung, "Core Experiment 9: Motion Vector Coding", Document # JCTVC-O509, Guangzhou, China, Oct. 2010.
Winken, et al., "Video Coding Technology Proposal by Fraunhofer HHI", Document # JCTVC-A116, Dresden, Germany, pp. 9-10, Apr. 24, 2010.
Yusuke Itani et al, "Adaptive Direct Vector Derivation for Video Coding," Picture Coding Symposium, Dec. 8, 2010C509, Guangzhou, China, Oct. 2010.

(Continued)

*Primary Examiner* — Christopher S Kelley
*Assistant Examiner* — Zhihan Zhou

(57) ABSTRACT

In one embodiment, a spatial merge mode or a temporal merge mode for a block of video content may be used in merging motion parameters. Both spatial and temporal merge parameters are considered concurrently and do not require utilization of bits or flags or indexing to signal a decoder. If the spatial merge mode is determined, the method merges the block of video content with a spatially-located block, where merging shares motion parameters between the spatially-located block and the block of video content. If the temporal merge mode is determined, the method merges the block of video content with a temporally-located block, where merging shares motion parameters between the temporally-located block and the block of video content.

3 Claims, 8 Drawing Sheets

(56) References Cited

OTHER PUBLICATIONS

Li B, et al., "Redundancy reduction in Cbf and merge coding", Document # JCTVC-C277, p. 6, Oct. 2, 2010.

Patent Cooperation Treaty, International Search Report and Written Opinion of the International Searching Authority for International Application No. PCT/US2012/021599, Mar. 28, 2012.

* cited by examiner

JOINT SPATIAL AND TEMPORAL BLOCK MERGE MODE FOR HEVC

CROSS REFERENCE TO RELATED APPLICATIONS

The present application claims priority to U.S. Provisional App. No. 61/433,006 for "Joint Spatial and Temporal Merge Mode for HEVC Temporal Block Merge Mode" filed Jan. 14, 2011, the contents of which is incorporated herein by reference in their entirety.

The present application is related to U.S. application Ser. No. 13/351,782 for "Temporal Block Merge Mode" and U.S. application Ser. No. 13/351,682 for "Spatial Block Merge Mode," filed concurrently, the contents of which are incorporated herein by reference in their entirety.

BACKGROUND

Particular embodiments generally relate to video compression.

In video sequences, a great degree of temporal redundancy may exist. That is, within a very short period of time, the shape(s) of foreground object(s) and the background within a picture may not vary very much, and pixels in the foreground objects may move along a similar nature. In object-based video coding, different parts of a picture can be coded and transmitted separately as video objects. Motion information of different pixels in the same object should be the same in some cases. However, many bits still need to be used to describe the arbitrary object shape, which reduces coding efficiency. Thus, the efficient representation of object motion is challenging.

High efficiency video coding (HEVC) is a block-based hybrid spatial and temporal predictive coding scheme. HEVC partitions an input picture into square blocks referred to as largest coding units (LCUs) that could be a size up to 64×64. Theoretically, a larger coding unit is preferred to take advantage of correlation among immediate neighboring pixels. Each LCU can be partitioned into smaller square blocks called coding units (CUs). FIG. 1A shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

To allow for flexible motion representation and higher coding efficiency, a quadtree data representation is used to describe how LCU 100 is partitioned into CUs 102. FIG. 1B shows a quadtree 104 of the LCU partition shown in FIG. 1A. Each node of quadtree 104 is assigned a flag of "1" if the node is further split into four sub-nodes and assigned a flag of "0" if the node is not split. The flag is called a split bit (e.g. 1) or stop bit (e.g., 0) and is coded in a compressed bitstream.

A node 106-1 includes a flag "1" at a top CU level because LCU 100 is split into 4 CUs. At an intermediate CU level, the flags indicate whether a CU 102 is further split into four CUs. In this case, a node 106-3 includes a flag of "1" because CU 102-2 has been split into four CUs 102-5-102-8. Nodes 106-2, 106-4, and 106-5 include a flag of "0" because these CUs 102 are not split. Nodes 106-6, 106-7, 106-8, and 106-9 are at a bottom CU level and hence, no flag bit of "0" or "1" is necessary for those nodes because corresponding CUs 102-5-102-8 are not split. The partitioning process may continue all the way to 4×4 blocks. The quadtree data representation for quadtree 104 shown in FIG. 1B may be represented by the binary data of "10100", where each bit represents a node 106 of quadtree 104. The binary data indicates the LCU partitioning to the encoder and decoder, and this binary data needs to be coded and transmitted as overhead.

Each CU 102 may include one or more prediction units (PUs). The PUs may be used to perform spatial prediction or temporal prediction. FIG. 2 shows an example of a CU partition of PUs 202. As shown, a CU 102 has been partitioned into four PUs 202-1-202-4. Spatial or temporal prediction coding may be performed over each PU 202. In inter-mode, motion parameters are coded and transmitted for each PU. The structure may require many bits for motion information, especially for irregularly shaped objects.

A spatial merge mode may be used to improve coding efficiency. The spatial merge mode may merge a current block with its neighboring block(s) to form a "region". All the pixels within the region share the same motion parameters. Thus, there is no need to code and transmit motion parameters for each individual block of a region. Instead, for a region, only one set of motion parameters is coded and transmitted. The current block is allowed to merge with a spatially-located block that is neighboring the current block to the left or the top. An indicator is used to specify whether the current block is merged with an available neighboring block, either the left neighboring block or the top neighboring block should be used in the spatial merge. The spatial merge mode is limited to merging with spatially-located blocks in the same frame.

A temporal merge mode may also be used to further improve coding efficiency. The temporal merge mode may enable a current block to use the motion parameters of its temporal neighboring block(s). Thus, there is no need to code and transmit motion parameters for each individual block merged by temporal merge mode. Instead, only one set of motion parameters is coded and transmitted. The current block is allowed to merge with a temporally-located block from a previous encoded/decoded picture. An indicator is used to specify whether the current block is merged with an available temporal neighboring block.

SUMMARY

One embodiment includes a method comprising determining a merge mode for a current block of video content, wherein the merge mode is selected from a candidate list, wherein the candidate list comprises neighboring blocks that are spatially and temporally located with the current block, determining the merge mode by analyzing the motion vector differences between the neighboring spatial blocks and temporal blocks, selecting one or more blocks for encoding the current block, encoding the current block using the motion parameters of the selected one or more selected blocks, and transmitting information to a decoder to indicate which motion parameters from the one or more selected blocks to use in decoding the current block, wherein the one or more spatially-located neighboring blocks reside in the same picture as the current block, and wherein the one or more temporally-located neighboring blocks reside in a different picture from the current block, wherein no bits, flags or indexes are used to indicate the merge mode. The candidate list can include one or more of spatially-located neighboring blocks, one or more of temporally-located neighboring blocks, or a combination thereof.

In one embodiment, the candidate list comprises $MV_A$, $MV_B$, $MV_C$, $MV_D$, assigned as motion vectors (MVs) of spatial neighbors A, B, C, and D, for a region and $MV_{A'}$, $MV_{B'}$, $MV_{C'}$, $MV_{D'}$, and $MV_{X'}$ assigned as MVs of the temporal neighbors A', B', C', D' and X', for a region. The candidate list can additionally comprise $refIdx_A$, $refIdx_B$, $refIdx_C$, $refIdx_D$, $refIdx_{A'}$, $refIdx_{B'}$, $refIdx_{C'}$, $refIdx_{D'}$, and $refIdx_{X'}$ assigned as reference pictures pointed by $MV_A$, $MV_B$, $MV_C$, $MV_D$, $MV_{A'}$, $MV_{B'}$, $MV_{C'}$, $MV_{D'}$, and $MV_{X'}$ individually. Determining the merge mode can additionally comprise scaling the motion vectors so that all the scaled motion vectors span the same temporal distance; and calculating spatial MV differences between $MV_A$ and $MV_D$ and between $MV_B$ and $MV_C$ as well as temporal MV difference between $MV_A$ and $MV_{A'}$, and between $MV_B$ and $MV_{B'}$.

Determining the merge mode can also additionally comprises defining the average norm of temporal MV differences as $\|\Delta MV_{Temporal}\| = \frac{1}{2}(\|\Delta MV_{AA'}\| + \|\Delta MV_{BB'}\|)$, and comparing the average norm of temporal MV difference, $\|\Delta MV_{Temporal}\|$, with the norms of the two spatial MV differences, $\Delta MV_{AD}$ and $\Delta MV_{BC}$. The encoding the current block may comprise determining temporal merge mode and merging block X with its temporal neighbor block X' if $\|\Delta MV_{Temporal}\| < \min(\|\Delta MV_{AD}\|, \|\Delta MV_{BC}\|)$, wherein block X and block X' will share the same $MV_{X'}$ and $refIdx_{X'}$. The encoding the current block may comprise determining top spatial merge mode and merging block X with top block B, if $\|\Delta MV_{Temporal}\| \geq \min(\|\Delta MV_{AD}\|, \|\Delta MV_{BC}\|)$ and $\|\Delta MV_{AD}\| \leq \|\Delta MV_{BC}\|$, wherein blocks X and A will share the same $MV_B$ and $refIdx_B$.

In one embodiment, encoding the current block comprises determining left spatial merge mode and merging block X with a left block A if not previously determined top spatial merge mode or temporal merge mode, wherein blocks X and A will share the same $MV_A$ and $refIdx_A$. The temporal distance between block X and its associated reference picture will be the same as between block X' and its associated reference picture.

Another embodiment includes a method including receiving a merge mode for a current block of video content, wherein the merge mode is selected from a candidate list, wherein the candidate list comprises neighboring blocks that are spatially and temporally located with the current block, and determining which candidate block is identified in the merge mode candidate list for decoding a current block of video content, wherein the one or more spatially-located neighboring blocks reside in the same picture as the current block; and wherein the one or more temporally-located neighboring blocks reside in a different picture from the current block, wherein no bits, flags or indexes are used to indicate the merge mode.

In one embodiment, the merge mode is one of a spatially-located neighboring block, a temporally-located neighboring block, a combination of spatially-located blocks, a combination of temporally-located blocks, and a combination of spatially-located and temporally-located blocks of the current block. The method may further comprise determining motion parameters for the at least one spatially-located block to the current block of video content, the at least one spatially-located block located in a same picture as the current block; and identifying the at least one spatially-located block in the merge mode candidate list, if the spatially-located block is identified in the candidate list for decoding the current block, the method further comprising using motion parameters for the at least one spatially-located block in decoding the current block of video content. The motion parameters to use in decoding the current block are from the temporally-located block, the spatially-located block, or a combination of motion parameters from spatially-located blocks to the current block. Determining which candidate block can comprise following a set of rules to determine which merge mode to use to determine which motion parameters from the candidate block to use in decoding the current block.

Another embodiment includes an apparatus comprising one or more computer processors and a computer-readable storage medium comprising instructions for controlling the one or more computer processors to be operable to determine motion parameters for at least one temporally-located block to a current block of video content, the temporally-located block located in a different picture from the current block, identify the at least one temporally-located block in a merge mode candidate list, the merge mode candidate list including candidate blocks in which motion parameters are candidates to be used for the current block, and encode information to a decoder to indicate which motion parameters from a candidate block on the merge mode candidate list to use in decoding the current block, wherein the one or more spatially-located neighboring blocks reside in the same picture as the current block, wherein the one or more temporally-located neighboring blocks reside in a different picture from the current block, and wherein no bits, flags or indexes are used to indicate the merge mode. The apparatus may be further operable to determine motion parameters for at least one spatially-located block to the current block of video content, the at least one spatially-located block located in a same picture as the current block, and identify the at least one spatially-located block in the merge mode candidate list. The at least one temporally-located block and the at least one spatially-located block may be included on the merge mode candidate list and information is signaled indicating which motion parameters of the at least one temporally-located block and the at least one spatially-located block to use in decoding the current block. The motion parameters to use in decoding the current block are from the at least one temporally-located block, the at least one spatially-located block, or a combination of motion parameters from spatially-located blocks to the current block. The signal may comprise a set of rules at an encoder to allow the decoder to determine which motion parameters from the candidate block on the merge mode candidate list to use.

Yet another embodiment includes an apparatus comprising one or more computer processors; and a computer-readable storage medium comprising instructions for controlling the one or more computer processors to be operable to receive signaling including a merge mode candidate list, the merge mode candidate list identifying candidate blocks in which motion parameters are candidates to be used for the current block, determine which candidate block is identified in the merge mode candidate list for decoding a current block of video content, and if a temporally-located block is identified, use motion parameters for the temporally-located block in decoding the current block of video content, the temporally-located block located in a different picture from the current block, wherein the one or more spatially-located neighboring blocks reside in the same picture as the current block, wherein the one or more temporally-located neighboring blocks reside in a different picture from the current block, and wherein no bits, flags or indexes are used to indicate the merge mode.

The merge mode candidate list includes at least one spatially-located block to the current block, the at least one spatially-located block located in a same picture as the current block, and if the at least one spatially-located block is identified in the candidate list for decoding the current block, further operable to use motion parameters for the at least one spatially-located block in decoding the current block of video content. The motion parameters from candidate blocks in the merge mode candidate list are from the at least one temporally-located block, the at least one spatially-located block or a combination of motion parameters from spatially-located blocks to the current block. Determining which candidate block can comprise following a set of rules to determine which merge mode to use to determine which motion parameters from the candidate block to use in decoding the current block.

The following detailed description and accompanying drawings provide a more detailed understanding of the nature and advantages of the present invention.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
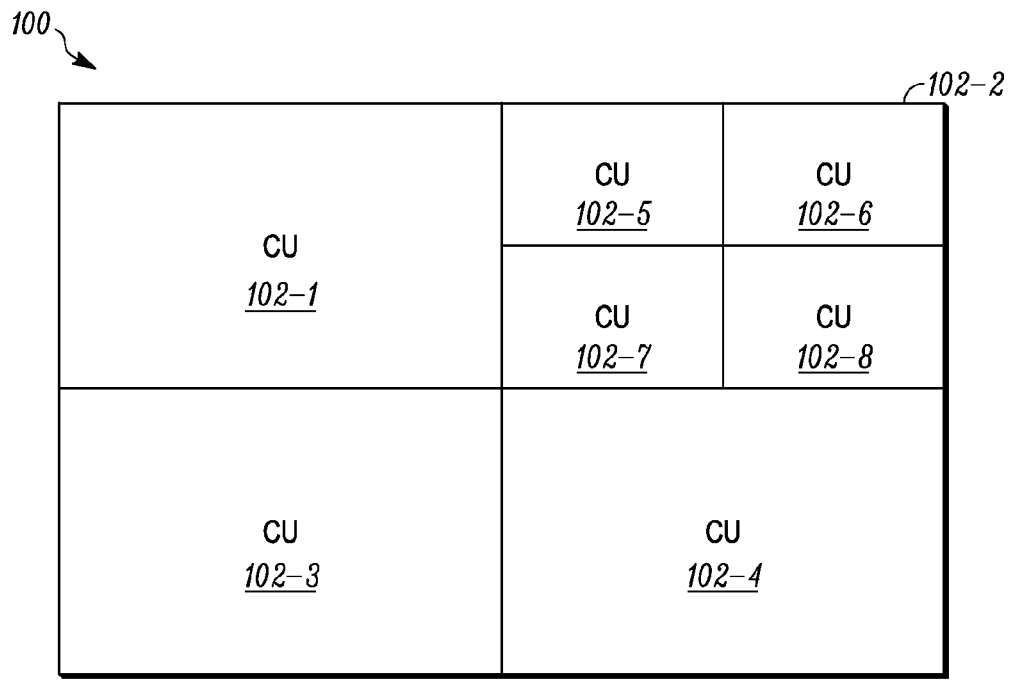
FIG. 1A shows an example of an LCU partition.
Figure 1B:
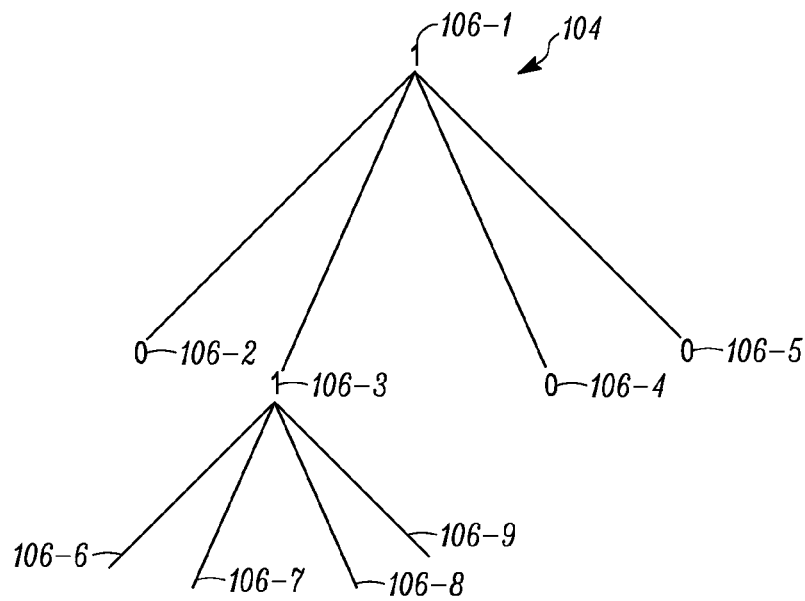
FIG. 1B shows a quadtree of the LCU partition shown in FIG. 1A.
Figure 2:
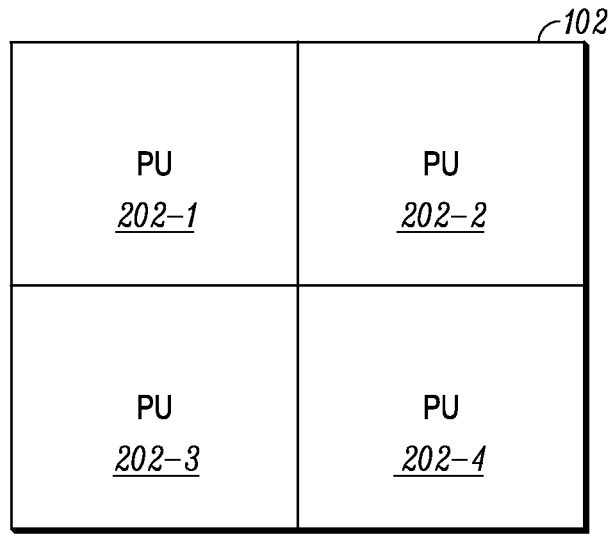
FIG. 2 shows an example of a CU partition of PUs
Figure 3:
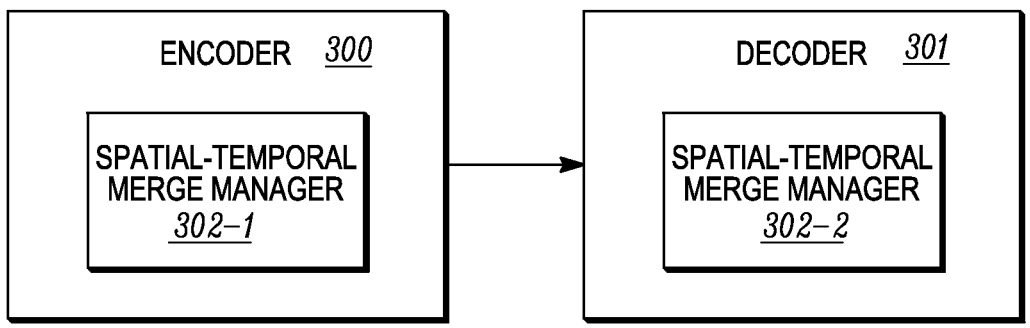
FIG. 3 depicts an example of a system for encoding and decoding video content according to one embodiment.

FIG. 3 depicts an example of a system for encoding and decoding video content according to one embodiment. The system includes an encoder 300 and a decoder 301, both of which will be described in more detail below. Encoder 300 uses a spatial-temporal merge manager 302-1 in an encoding process and decoder 301 uses a spatial-temporal merge manager 302-2 in a decoding process. In one embodiment, encoder 300 and decoder 301 use the HEVC coding scheme.

Each spatial-temporal merge manager 302 allows temporal correlation to be taken into consideration in addition to spatially-located blocks while in a merge mode. That is, given a current block in the merge mode, spatially-located blocks may be used (i.e., a spatial merge mode) in addition to a temporally-located block (i.e., a temporal merge mode) in a merge with the current block. For example, the left and top neighboring blocks may be used as spatially-located blocks, and a block in a previously coded picture, such as a co-located block in another frame (e.g., previously coded frame) to the current block, may be used as a temporally-located block. A co-located block may be a block that is in a similar position as the current block in another frame, such as any frame that has been encoded/decoded before the current block may be used. Blocks in other frames other than a co-located block may also be used. Motion parameters of the current block may be derived from the spatially-located blocks and used in the spatial merge, and/or from temporally-located blocks and used in the temporal merge.

As in the spatial merge mode, the temporal merge mode may merge a current block with the temporally-located block to form a "region". All the pixels within the region share the same motion parameters. Thus, there is no need to code and transmit motion parameters for the current block. Instead, motion parameters of a temporally-located block can be used for the current block.

In addition, a current block may conceptually merge with more than one spatially-located block and/or temporally-located block, and uses the motion parameters of more than one spatially-located block and/or temporally-located blocks to form its own motion parameters. For example, the current block may conceptually merge with two different spatially-located blocks, and uses the motion parameters from the two different spatially-located blocks to form the motion parameters in spatial merge.

The motion parameters, including motion vectors, may be scaled according to the time (temporal) difference between the reference picture and the current picture. Motion parameters are motion vectors plus reference picture indices. Reference picture indices are used to indicate which picture is used for reference. For the scaling process, this should be applied on motion vectors. For example, block A is the current block in picture 3 and it needs to get a reference in picture 2. Block B is the upper block and its motion parameter points to a reference in picture 1. Due to the different reference pictures, the motion vector of block B needs to be scaled before applied to block A in merge mode.

The temporally-located and spatially-located blocks described above may be identified on a merge mode candidate list. For example, the temporally-located block, the left and top spatially-located blocks, and conceptually combined blocks may be candidates to be merged with a current block. Particular embodiments provide do not require signaling in the form of bits, flags or indexing from spatial-temporal merge manager 302-1 to spatial-temporal merge manager 302-2 to indicate with which block the current block is merged. Hence, the decoder will know which block's motion parameters are to be used in decoding the current block. For example, signaling of which merge mode may not be performed as encoder 300 and decoder 301 may follow a set of rules to determine which merge mode to use. Additionally, other flags may be used.

The temporally-located block may be used to leverage temporal redundancy that may exist in video sequences. That is, the shape of objects may not change to a great degree in a short period of time. Thus, the motion parameters for a temporally-located block may be used with a current block.

FIGS. 4-8 illustrate the various merging scenarios for spatial-temporal merging according to one embodiment. Which merge mode, either spatial merge mode, or temporal merge mode, to use, may be determined in different ways. For example, U.S. application Ser. No. 13/351,782 for "Temporal Block Merge Mode" describes different ways of determining which merge mode to use and how to signal certain parameters. Described herein are different ways of determining which merge mode to use.

Figure 4:
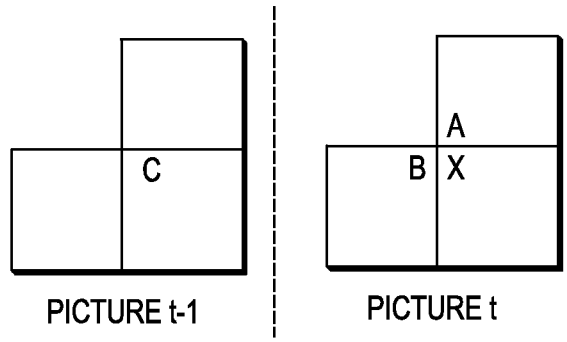
FIG. 4 depicts temporal and spatial neighboring blocks according to one embodiment.

FIG. 4 depicts temporal and spatial neighboring blocks according to one embodiment. In a frame t, a current block is a block X. Current block X is allowed to spatially merge with a left neighboring block, block B, or a top neighboring block, a block A. Additionally, current block X is allowed to temporally merge with a block C in a different picture t−1. Block C is temporally co-located with current block X. That is, block C is located in a same position as block X but at a different time. For example, block C may have been coded at a previous time.

Figure 5:
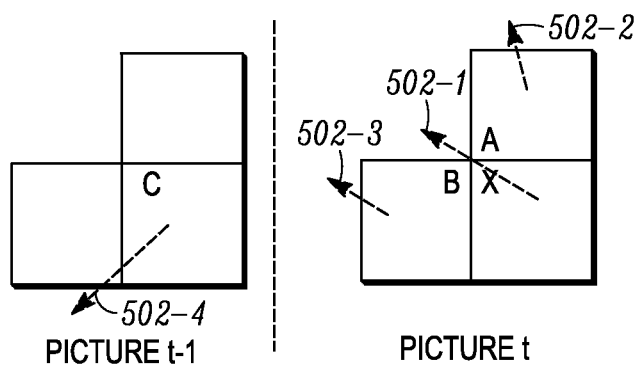
FIG. 5 depicts a scenario when block X is not in any merge mode according to one embodiment.

FIG. 5, for reference purposes, depicts a scenario when block X is not in any merge mode according to one embodiment. Motion vectors 502-1, 502-2, and 502-3 are shown for blocks in frame t. A motion vector 502-4 is shown for block C in frame t−1. In this case, the motion parameters, such as the motion vector, need to be coded. Additionally, the motion parameters may be a reference picture index indicating which reference picture is used for prediction. In such embodiments, the actual motion parameters are sent from encoder 300 to decoder 301 in this case.

Figure 6:
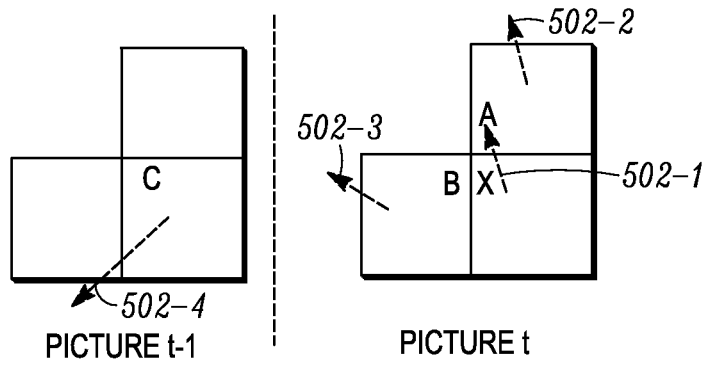
FIG. 6 depicts a scenario when block X is merged with block A in the spatial merge mode according to one embodiment.

FIG. 6 depicts a scenario when block X is merged with block A in the spatial merge mode according to one embodiment. In this case, motion vector 502-1 for block X is the same as motion vector 502-2. Block X is thus spatially merged with block A, which is the top neighboring block. Motion parameters for motion vector 502-1 only need to be coded once in this example for block X and block A. As will be discussed below, certain calculations will determine that block X is merged with block A.

Figure 7:
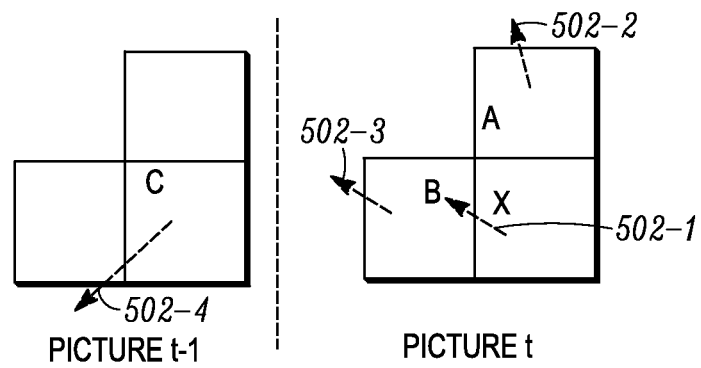
FIG. 7 depicts a scenario when block X is merged with block B in the spatial merge mode according to one embodiment.

FIG. 7 depicts a scenario when block X is merged with block B in the spatial merge mode according to one embodiment. Block B is the left neighboring block to block X, and motion vector 502-1 is the same as motion vector 502-3 for block B. Motion parameters only need to be coded once in this example for block X and block B. That is, the same motion parameters used for block B, such as motion vector 502-3, are used to for block X.

Figure 8:
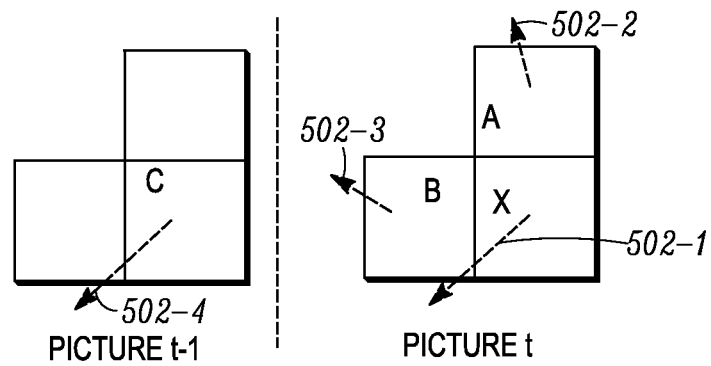
FIG. 8 depicts a scenario when block X is merged with block C in a temporal merge mode according to one embodiment.

FIG. 8 depicts a scenario when block X is merged with block C in a temporal merge mode according to one embodiment. Motion vector 502-1 for block X is the same as motion vector 502-4 for block C. In this case, motion parameters only need to be coded once in this example for block X and block C. For example, motion parameters are not coded for block X, and the motion parameters, such as motion vector 502-4, for block C are used.

Known methods use different ways of indicating which merge mode to use. In one embodiment, an index may be used. Also, flags, such as the three flags merge_flag, merge_temporal_flag, and merge_left_flag, may be used. In all these cases, the use of two-three extra bits must be used to communicate the signal.

The advantage of merge mode is the saving of motion information for block X. However, in current methods known in the art, one extra bit is required for a current block to indicate if the current block is in merge mode, or not, for example, through the use of flags. Using an embodiment utilizing flags, if the current block is in merge mode, for example merge_flag is set to 1, one additional bit is required to indicate if the current block is merged with its left or top coded neighboring block if the left and top coded neighboring blocks have different motion information. In one embodiment, flag can be used, for example, merge_temporal_flag and merge_left_flag to signal such scenarios.

Therefore, when the use of merge mode is present, it adds one or two additional bits per block. This one or two bits per block can be costly, especially at low bit-rates.

Described herein is a way to save one bit per block. Instead of sending the bit to signal if the current block is merged with its top or left neighboring block, the merging direction is derived based upon the motion information of the coded neighboring blocks. Further, also disclosed is consideration of the temporal collocated block, but which in current practice requires an additional bit to signal if the current block is merged either temporally or spatially. In total, three bits per block are required to implement this joint temporal and spatial merge mode.

Accordingly, described herein, are systems and methods to implement joint temporal and spatial merge mode, but also save the bit required to indicate whether a current block is merged temporally or spatially and the bit required to indicate whether a current block is merged with its left or top neighboring block or a temporally located block. Specifically, given a current block in merge mode, merging direction is dependent upon motion information of the neighboring blocks.

Figure 9:
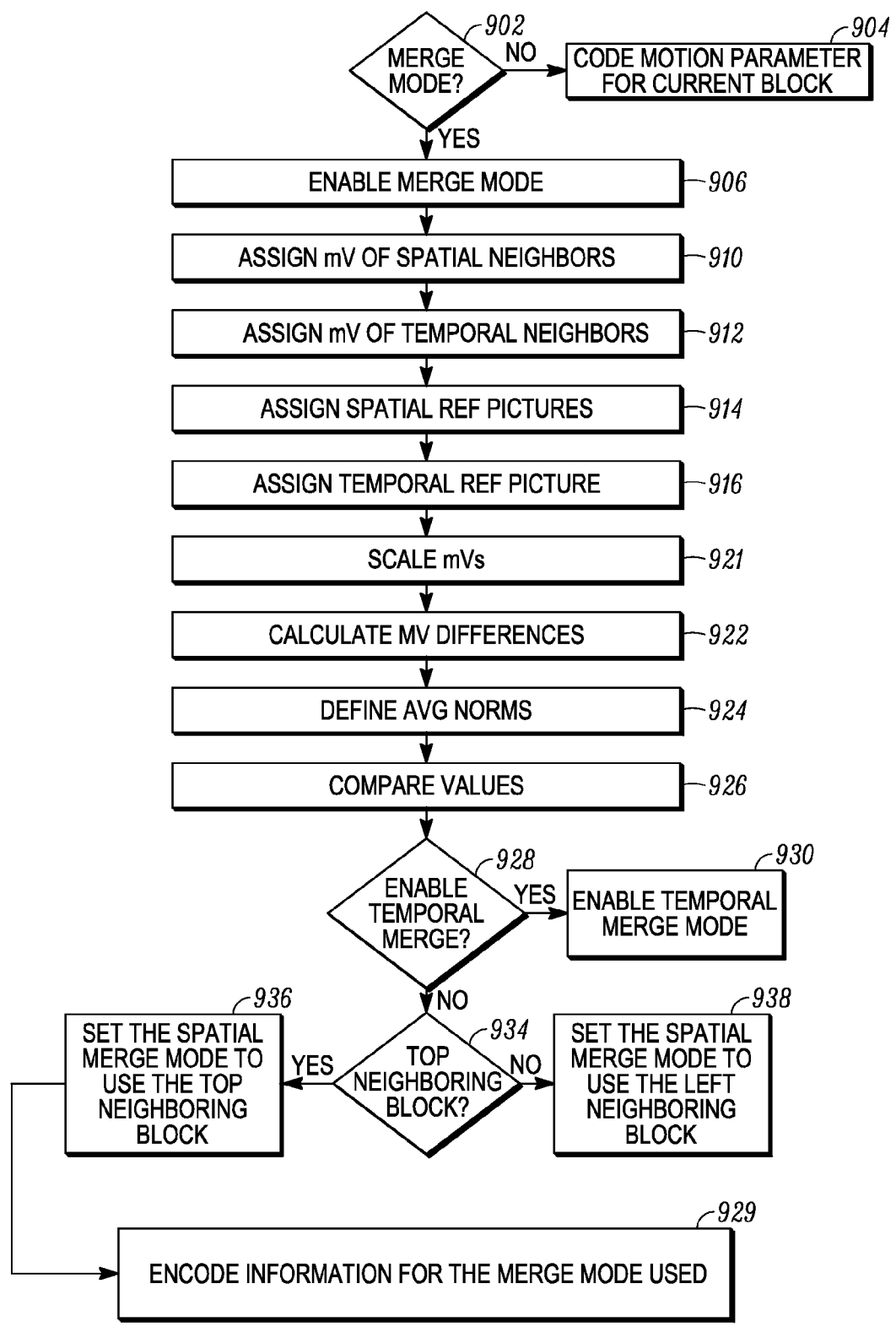
FIG. 9 depicts a simplified flowchart of a method for determining which mode to use in an encoding process according to one embodiment.

Particular embodiments use different ways of indicating which block to use from a merge mode candidate list. FIG. 9 depicts a simplified flowchart of a method for determining which mode to use in an encoding process according to one embodiment. At 902, spatial-temporal merge manager 302-1 determines if a current block X should be in a merge mode. If not, at 904, motion parameters for block X are coded. This may be the normal coding process for block X. Either flags, indexes or some other mechanism is used to indicate that merge mode is not enabled.

If a merge mode is selected, at 906, spatial-temporal merge manager 302-1 enables the merge mode. For example, spatial-temporal merge manager 302-1 sets an index, flag, bit or some other indicator to indicate that the merge mode is enabled.

At block 910, let $MV_A$, $MV_B$, $MV_C$, $MV_D$ be the MV of the spatial neighbors A, B, C, and D, and at block 912, let $MV_{A'}$, $MV_{B'}$, $MV_{C'}$, $MV_{D'}$, and $MV_{X'}$ be the MV of the temporal neighbors A', B', C', D' and X' per reference list individually.

At blocks 914 and 916, also let $refIdx_A$, $refIdx_B$, $refIdx_C$, $refIdx_D$, $refIdx_{A'}$, $refIdx_{B'}$, $refIdx_{C'}$, $refIdx_{D'}$, and $refIdx_{X'}$ be the reference pictures pointed by $MV_A$, $MV_B$, $MV_C$, $MV_D$, $MV_{A'}$, $MV_{B'}$, $MV_{C'}$, $MV_{D'}$ and $MV_{X'}$ individually.

As previously mentioned, the current block X is in merge mode. Possible actions include being temporally merged with block X', or spatially merged with either block A or block B.

Instead of sending bits, flags, indexing or some other signaling, specifically, given a current block in merge mode, merging direction is determined dependent upon motion information to the neighboring blocks. This is explained in more detail, below.

A current block X has four spatially coded neighbors, A, B, C and D in the current picture, and four temporally coded neighboring block A', B' C' and D' in previously coded picture. There may be one, two, or more reference lists available for the current block X.

The merging direction of block X per reference list is determined as follows:

At block 921 Scale $MV_A$, $MV_B$, $MV_C$, $MV_D$, $MV_{A'}$, $MV_{B'}$, $MV_{C'}$, and $MV_{D'}$ so that all the scaled MVs span the same temporal distance, that is, $$\begin{cases} MV_A = \text{scale}(MV_A) \\ MV_B = \text{scale}(MV_B) \\ MV_C = \text{scale}(MV_C) \\ MV_D = \text{scale}(MV_D) \\ MV_{A'} = \text{scale}(MV_{A'}) \\ MV_{B'} = \text{scale}(MV_{B'}) \\ MV_{C'} = \text{scale}(MV_{C'}) \\ MV_{D'} = \text{scale}(MV_{D'}) \end{cases}$$

At block 922, the spatial MV differences between $MV_A$ and $MV_D$ and between $MV_B$ and $MV_C$, are calculated, as well as the temporal MV difference between $MV_A$ and $MV_{A'}$, and between $MV_B$ and $MV_{B'}$ as $$\begin{cases} \Delta MV_{AD} = MV_A - MV_D \\ \Delta MV_{BC} = MV_B - MV_C \\ \Delta MV_{AA'} = MV_A - MV_{A'} \\ \Delta MV_{BB'} = MV_B - MV_{B'} \end{cases}$$

At block 924, define the average norm of temporal MV differences as $\|\Delta MV_{Temporal}\| = \frac{1}{2}(\|\Delta MV_{AA'}\| + \|\Delta MV_{BB'}\|)$.

At block 926, compare the average norm of temporal MV difference, $\|\Delta MV_{Temporal}\|$, with the norms of other two spatial MV differences, $\Delta MV_{AD}$ and $\Delta MV_{BC}$.

At decision 928, spatial-temporal merge manager 302-1 determines $\|\Delta MV_{Temporal}\| < \min(\|\Delta MV_{AD}\|, \|\Delta MV_{BC}\|)$. If true, temporal merge mode should be enabled, as in block 930, and X is merged with its temporal neighbor block X'. Block X and block X' will share the same $MV_{X'}$, and $refIdx_{X'}$. Note that the temporal distance between block X and its associated reference picture will be the same as between block X' and its associated reference picture.

Otherwise, advancing to block 934, if spatial-temporal merge manager 302-1 determines that $\|\Delta MV_{Temporal}\| \geq \min(\|\Delta MV_{AD}\|, \|\Delta MV_{BC}\|)$ and that $\|\Delta MV_{AD}\| \leq \|\Delta MV_{BC}\|$ are both true, then, the top neighboring block is to be used in the spatial merge, that is, that the calculation result itself indicates that the top neighboring block should be merged spatially with block X, for example, at block 936, block X is merged with the top block B, implying blocks X and B will share the same $MV_B$ and $refIdx_B$, Otherwise, at block 938, block X is merged with the left block A, implying blocks X and A will share the same $MV_A$ and $refIdx_A$. In other embodiments, operations can be performed to indicate with blocks other than the left and the top neighboring blocks should be used.

At 929, spatial-temporal merge manager 302-1 has determined and may store information indicating the merge mode used. Encoder 300 also encodes the motion parameters for the merged region at least once. Each block in the merged region use the same motion parameters so sending the motion parameters for each block in the region is avoided, which reduces overhead.

In an alternative embodiment is as follows: Returning to FIG. 9, blocks 902-921 are performed, but with the following alternate values:

At block 922, the spatial MV differences are calculated between $MV_A$ and $MV_D$ and between $MV_B$ and $MV_D$, as well as at block 922 the temporal MV differences between $MV_A$ and $MV_{A'}$, between $MV_B$ and $MV_{B'}$, between $MV_C$ and $MV_{C'}$, and between $MV_D$ and $MV_{D'}$, that is, $$\begin{cases} \Delta MV_{AD} = MV_A - MV_D \\ \Delta MV_{BD} = MV_B - MV_D \\ \Delta MV_{AA'} = MV_A - MV_{A'} \\ \Delta MV_{BB'} = MV_B - MV_{B'} \\ \Delta MV_{CC'} = MV_C - MV_{C'} \\ \Delta MV_{DD'} = MV_D - MV_{D'} \end{cases}$$

At block 924, define the average norm of temporal MV difference as $\|\Delta MV_{Temporal}\| = \frac{1}{4}(\|\Delta MV_{AA'}\| + \|\Delta MV_{BB'}\| + \|\Delta MV_{CC'}\| + \|\Delta MV_{DD'}\|)$ At block 926, compare $\|\Delta MV_{Temporal}\|$, $\|\Delta MV_{AD}\|$ and $\|\Delta MV_{BC}\|$ to determine the merging direction of block X.

At decision block 928, if $\|\Delta MV_{Temporal}\| < \min(\|\Delta MV_{AD}\|, \|\Delta MV_{BC}\|)$, Current block X is merged with its temporal neighbor block X' at block 930. Block X and block X' will share the same $MV_{X'}$, and $refIdx_{X'}$. Note that the temporal distance between block X and its associated reference picture will be the same as between block X' and its associated reference picture. Otherwise, the method advances to block 934 and spatial merge mode is engaged at blocks 928 or 936. At block 929 the information is encoded.

There may be one or more derived MV(s) for a current block X in merge mode, depending upon the number of reference lists available for the current block X.

Since blocks A, B, C, D, A', B', C', D' and X' are coded block for the current block X, their motion information are available for both encoder and decoder. Hence, no bit is required to indicate which neighboring block's motion information is used for a current block in merge mode.

Note that if A, B, C, D, A', B', C', D', or X' is not available or in intra mode, the associated MV(s) are set to be (0,0) and refIdx to −1.

Figure 10:
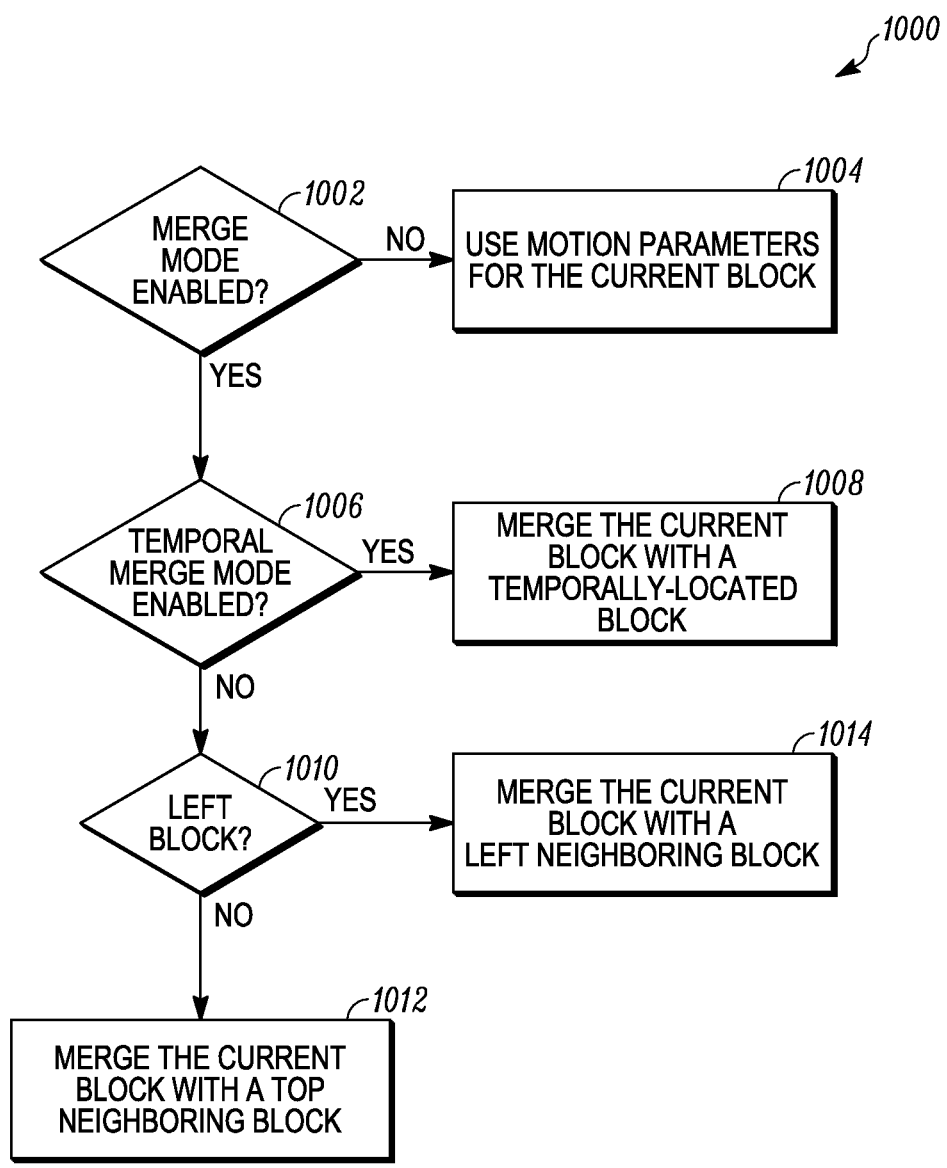
FIG. 10 depicts a simplified flowchart of a method for decoding for a current block according to one embodiment

FIG. 10 depicts a simplified flowchart 1000 of a method for decoding for a current block according to one embodiment. At 1002, spatial-temporal merge manager 302-2 determines if the merge mode is enabled for a current block X. For example, spatial-temporal merge manager 302-2 determines if the flag merge_flag is set to a value of "0" to indicate that current block X is not in any merge mode or to a value of "1" to indicate that the current block X is in the merge mode. If the merge mode is not enabled, at 1004, then motion parameters for block X are determined and used in motion prediction at decoder 301. In another embodiment, information in an index is used to determine if the merge mode is or is not enabled.

At 1006, spatial-temporal merge manager 302-2 determines if the temporal merge mode is enabled.

At block 1010, $MV_A$, $MV_B$, $MV_C$, $MV_D$ are set to the MV of the spatial neighbors A, B, C, and D, and at block 1012, let $MV_{A'}$, $MV_{B'}$, $MV_{C'}$, $MV_{D'}$, and $MV_{X'}$ are set to the MV of the temporal neighbors A', B', C', D' and X' per reference list individually.

At blocks 1014 and 1016, $refIdx_A$, $refIdx_B$, $refIdx_C$, $refIdx_D$, $refIdx_{A'}$, $refIdx_{B'}$, $refIdx_{C'}$, $refIdx_{D'}$, and $refIdx_{X'}$ are set to the reference pictures pointed by $MV_A$, $MV_B$, $MV_C$, $MV_D$, $MV_{A'}$, $MV_{B'}$, $MV_{C'}$, $MV_{D'}$ and $MV_{X'}$ individually.

As in the encoder, instead of receiving bits, flags, indexing or some other signaling, specifically, given a current block in merge mode, merging direction is determined dependent upon motion information to the neighboring blocks. This is explained in more detail, below.

Again, the merging direction of block X per reference list is determined as follows:

At block 1021 $MV_A$, $MV_B$, $MV_C$, $MV_D$, $MV_{A'}$, $MV_{B'}$, $MV_{C'}$, and $MV_{D'}$ are all scaled so that all the scaled MVs span the same temporal distance, that is, $$\begin{cases} MV_A = \text{scale}(MV_A) \\ MV_B = \text{scale}(MV_B) \\ MV_C = \text{scale}(MV_C) \\ MV_D = \text{scale}(MV_D) \\ MV_{A'} = \text{scale}(MV_{A'}) \\ MV_{B'} = \text{scale}(MV_{B'}) \\ MV_{C'} = \text{scale}(MV_{C'}) \\ MV_{D'} = \text{scale}(MV_{D'}) \end{cases}$$

At block 1022, the spatial MV differences between $MV_A$ and $MV_D$ and between $MV_B$ and $MV_C$ are calculated, as well as the temporal MV difference between $MV_A$ and $MV_{A'}$, and between $MV_B$ and $MV_{B'}$ as $$\begin{cases} \Delta MV_{AD} = MV_A - MV_D \\ \Delta MV_{BC} = MV_B - MV_C \\ \Delta MV_{AA'} = MV_A - MV_{A'} \\ \Delta MV_{BB'} = MV_B - MV_{B'} \end{cases}$$

At block 1024, define the average norm of temporal MV differences as $\|\Delta MV_{Temporal}\| = \frac{1}{2}(\|\Delta MV_{AA'}\| + \|\Delta MV_{BB'}\|)$.

At block 1026, compare the average norm of temporal MV difference, $\|\Delta MV_{Temporal}\|$, with the norms of other two spatial MV differences, $\Delta MV_{AD}$ and $\Delta MV_{BC}$.

At decision 1028, spatial-temporal merge manager 302-1 determines $\|\Delta MV_{Temporal}\| < \min(\|\Delta MV_{AD}\|, \|\Delta MV_{BC}\|)$. If true, temporal merge mode should be enabled, as in block 1030, and X is merged with its temporal neighbor block X'. Block X and block X' will share the same $MV_{X'}$, and $\text{refIdx}_{X'}$. Note that the temporal distance between block X and its associated reference picture will be the same as between block X' and its associated reference picture.

Otherwise, advancing to block 1034, if spatial-temporal merge manager 302-1 determines that $\|\Delta MV_{Temporal}\| \geq \min(\|\Delta MV_{AD}\|, \|\Delta MV_{BC}\|)$ and that $\|\Delta MV_{AD}\| \leq \|\Delta MV_{BC}\|$ are both true, then, the top neighboring block is to be used in the spatial merge, that is, that the calculation result itself indicates that the top neighboring block should be merged spatially with block X, for example, at block 1036, block X is merged with the top block B, implying blocks X and B will share the same $MV_B$ and $\text{refIdx}_B$, Otherwise, at block 1038, block X is merged with the left block A, implying blocks X and A will share the same $MV_A$ and $\text{refIdx}_A$. In other embodiments, operations can be performed to indicate with blocks other than the left and the top neighboring blocks should be used.

For example, the encoded value will indicate the type of merge. If the encoded value indicates a spatial merge, then the current block is merged spatially. However, the encoded information can also indicate a temporal merge mode, and then, for example, at 1008, the current block is merged temporally with a temporally-located block. For example, current block X may be merged with a temporally co-located block C. In this case, coding parameters for block C may be used in the motion prediction.

At 1010, if the temporal merge mode is not enabled, spatial-temporal merge manager 302-2 determines which spatially-located block should be used in a spatial merge mode. At 1012, if the left neighboring block should not be used, then the current block is merged with a top neighboring block. In this case, coding parameters for the top neighboring block are used in the motion prediction. At 1014, if the left neighboring block should be used, then the current block is merged with a left neighboring block. In this case, coding parameters for the left neighboring block are used in the motion prediction.

Figure 11:
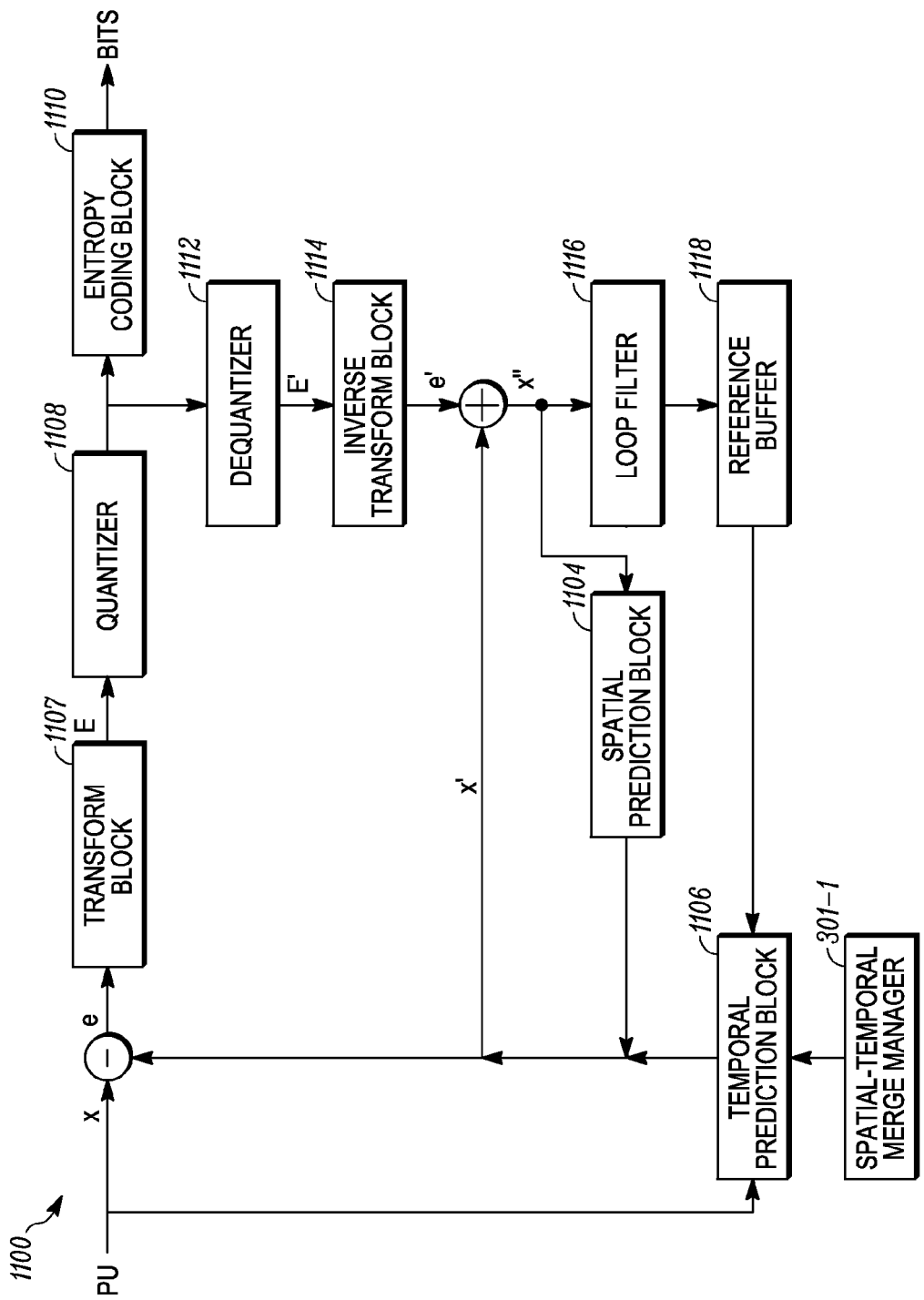
FIG. 11 depicts an example of an encoder according to one embodiment.

FIG. 11 depicts an example of an encoder 300 according to one embodiment. A general operation of encoder 300 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 1104 may include different spatial prediction directions per PU, such as horizontal, vertical, 45-degree diagonal, 135-degree diagonal, DC (flat averaging), and planar.

A temporal prediction block 1106 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream. In motion compensation, a best match prediction for the current PU is determined using the MV and refIdx.

Spatial-temporal merge manager 302-1 may communicate with a temporal prediction block 1106 to perform motion prediction for a current PU. If the current block is merged with a spatially-located block or a temporally-located block, spatial-temporal merge manager 302-1 may signal information indicating which block should be used in decoding the current block. Motion parameters for the current block do not need to be signaled again if the current block is merged spatially or temporally.

Transform block 1107 performs a transform operation with the residual PU, e. Transform block 1107 outputs the residual PU in a transform domain, E.

A quantizer 1108 then quantizes the transform coefficients of the residual PU, E. Quantizer 1108 converts the transform coefficients into a finite number of possible values. Entropy coding block 1110 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 300, a de-quantizer 1112 de-quantizes the quantized transform coefficients of the residual PU. De-quantizer 1112 then outputs the de-quantized transform coefficients, E'. An inverse transform block 1114 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive filtering over the reconstructed PU, which minimizes coding distortion between the input and output pictures. Additionally, if the reconstructed pictures are reference pictures, the reference pictures are stored in a reference buffer 1118 for future temporal prediction.

Figure 12:
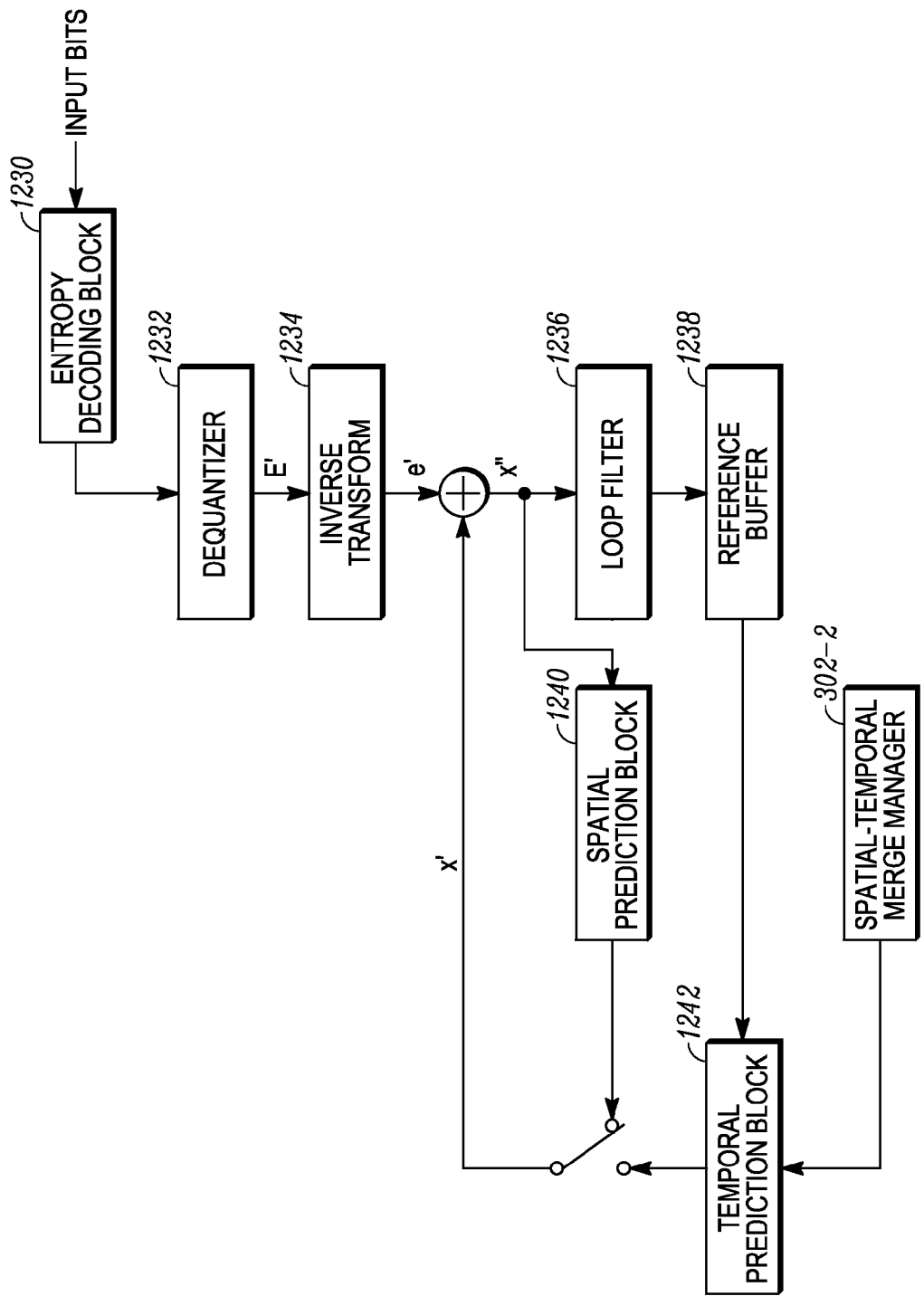
FIG. 12 depicts an example of a decoder according to one embodiment.

FIG. 12 depicts an example of decoder 301 according to one embodiment. A general operation of decoder 301 will now be described. It will be understood that variations on the decoding process described will be appreciated by a person skilled in the art based on the disclosure and teachings herein. Decoder 301 receives input bits from encoder 300 for compressed video content.

An entropy decoding block 1230 performs entropy decoding on input bits corresponding to quantized transform coefficients of a residual PU. A de-quantizer 1232 de-quantizes the quantized transform coefficients of the residual PU. De-quantizer 1232 then outputs the de-quantized transform coefficients of the residual PU, E'. An inverse transform block 1234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 1236 performs de-blocking on the reconstructed PU, x", to reduce blocking artifacts. Additionally, loop filter 1236 may perform a sample adaptive offset process after the completion of the de-blocking filter process for the decoded picture, which compensates for a pixel value offset between reconstructed pixels and original pixels. Also, loop filter 1236 may perform an adaptive loop filter over the reconstructed PU, which minimizes coding distortion between the input and output pictures. Additionally, if the reconstructed pictures are reference pictures, the reference pictures are stored in a reference buffer 1238 for future temporal prediction.

The prediction PU, x', is obtained through either spatial prediction or temporal prediction. A spatial prediction block 1240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Temporal prediction block 1242 performs temporal prediction through a motion estimation and motion compensation operation. A decoded motion vector or a motion vector derived from other motion information is then used to determine the prediction PU, x'.

Spatial-temporal merge manager 302-2 receives signaling from spatial-temporal merge manager 302-1 indicating which block's motion parameters to use for the current PU. Spatial-temporal merge manager 302-2 may communicate with temporal prediction block 1242 to indicate whether the current PU should use motion parameters of a spatially-located block or a temporally-located block. For example, decoded motion vector(s) of a temporally-located block may be used or decoded motion vector(s) of a spatially-located block may be used in a temporal prediction.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

The invention claimed is:

1. A method comprising:
   determining a merge mode for a current block of video content, wherein the merge mode is selected from a candidate list, wherein the candidate list comprises neighboring blocks that are spatially and temporally located with the current block;
   determining the merge mode by analyzing motion vector differences between the neighboring spatial blocks and temporal blocks;
   selecting one or more blocks for encoding the current block;
   encoding the current block using motion parameters of the selected one or more selected blocks; and
   transmitting information to a decoder to indicate which motion parameters from the one or more selected blocks to use in decoding the current block;
   wherein the one or more spatially-located neighboring blocks reside in the same picture as the current block;
   wherein the one or more temporally-located neighboring blocks reside in a different picture from the current block;
   wherein no bits, flags or indexes are used to indicate the merge mode;
   wherein the candidate list comprises:
      $MV_A$, $MV_B$, $MV_C$, $MV_D$ assigned as motion vectors (MVs) of spatial neighbors A, B, C, and D, for a region; and
      $MV_{A'}$, $MV_{B'}$, $MV_{C'}$, $MV_{D'}$ and $MV_X$ assigned as MVs of the temporal neighbors A', B', C', D' and X', for a region;
   wherein determining the merge mode additionally comprises:
      scaling the motion vectors so that all the scaled motion vectors span the same temporal distance; and
      calculating spatial MV differences between $MV_A$ and $MV_D$ and between $MV_B$ and $MV_C$ as well as temporal MV difference between $MV_A$ and $MV_{A'}$ and between $MV_B$ and $MV_{B'}$ as $$\begin{cases} \Delta MV_{AD} = MV_A - MV_D \\ \Delta MV_{BC} = MV_B - MV_C \\ \Delta MV_{AA'} = MV_A - MV_{A'} \\ \Delta MV_{BB'} = MV_B - MV_{B'}; \end{cases}$$

and
   wherein determining the merge mode additionally comprises:

defining the average norm of temporal MV differences as $\|\Delta MV_{Temporal}\| = \frac{1}{2}(\|\Delta MV_{AA'}\| + \|\Delta MV_{BB'}\|)$; and comparing the average norm of temporal MV difference, $\|\Delta MV_{Temporal}\|$, with the norms of the two spatial MV differences, $\Delta MV_{AD}$ and $\Delta MV_{BC}$.

2. The method of claim 1, wherein the candidate list comprises one or more of spatially-located neighboring blocks, one or more of temporally-located neighboring blocks, or a combination thereof.

3. The method of claim 1 wherein the candidate list additionally comprises:

refIdx$_A$, refIdx$_B$, refIdx$_C$, refIdx$_D$, refIdx$_{A'}$, refIdx$_{B'}$, refIdx$_{C'}$, refIdx$_{D'}$, and refIdx$_{X'}$, assigned as reference pictures pointed by MV$_A$, MV$_B$, MV$_C$, MV$_D$, MV$_{A'}$, MV$_{B'}$, MV$_{C'}$, MV$_{D'}$, and MV$_{X'}$, individually.

* * * * *